United States Patent Office 3,642,789
Patented Feb. 15, 1972

3,642,789
INDENO[1,2-b]-1,4-OXAZINES
Herman Eldridge Faith and Donald L. Trepanier, Indianapolis, Ind., assignors to The Dow Chemical Company, Midland, Mich.
No Drawing. Filed Feb. 13, 1970, Ser. No. 11,285
Int. Cl. C07d 87/22
U.S. Cl. 260—244 R
10 Claims

ABSTRACT OF THE DISCLOSURE

Indeno[1,2-b]-1,4-oxazine compounds and their pharmaceutically-acceptable salts such as 4,4a,5,9b-tetrahydroindeno[1,2-b]-1,4-oxazine-3(2H)-one, are prepared by the reaction of 2-amino-1-indanol with a substituted acetyl compound such as ethyl chloroacetate or α-bromophenylacetyl chloride. The compounds are useful as antidepressants as indicated by their antagonism of reserpine and their potentiation of amphetamine.

SUMMARY OF THE INVENTION

This invention relates to indeno[1,2-b]-1,4-oxazine compounds and is more particularly directed to 4,4a,5,9b-tetrahydro and 2,3,4,4a,5,9b-hexahydroindeno[1,2-b]-1,4-oxazine compounds corresponding to one of the formulae

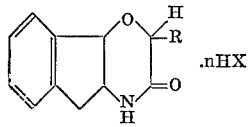

I; and

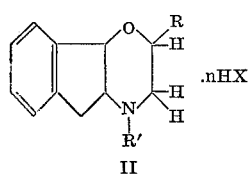

II

In the present specification and claims R represents hydrogen or phenyl, R' represents hydrogen or methyl, $n$ represents one of the integers zero and one and HX represents the acid moiety of a pharmaceutically-acceptable salt. The term "pharmaceutically-acceptable salt" as herein employed refers to salts of the ideno-[1,2-b]-1,4-oxazine compounds which are substantially non-toxic at dosage rates consistent with good pharmacological activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

For the sake of convenience, the novel compounds corresponding to the above Formulae I and II will be referred to hereinafter as "indeno oxazines."

The novel indeno oxazine compounds are crystalline solids which are of varying degrees of solubility in organic solvents such as ether, alcohols, tetrahydrofuran, chlorinated hydrocarbons, lower alkanes and esters such as ethyl acetate and which are slightly soluble in water. The pharmaceutically-acceptable salts of the indeno oxazines are crystalline solids which are slightly soluble in benzene and ethers and moderately soluble in water and alcohols.

The indeno oxazine compounds of the invention have been found to be useful for administration to laboratory animals in the study of drug effects on the central and peripheral nervous systems. They have been found to be particularly useful as antidepressants as indicated by their antagonism of reserpine-induced depression and their potentiation of d-amphetamine toxicity. Preferred compounds include those corresponding to one of the above Formulae in which R is hydrogen or R' is methyl.

The novel compounds corresponding to Formula I can be prepared by the reaction of 2-amino-1-indanol corresponding to Formula III with a substituted acetyl compound corresponding to Formula IV:

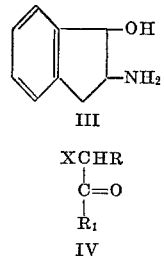

In Formula IV above, R has the significance set out above with respect to Formulae I and II, X represents chlorine or bromine, and R₁ represents the methoxy or ethoxy residue of a methyl or ethyl haloacetate or the chlorine or bromine atom of a substituted acetyl halide. When R represents hydrogen, the preferred acetyl compound is a methyl or ethyl chloroacetate and sodium hydride is empolyed as an additional reactant. When R is phenyl, the preferred acetyl compound is α-bromophenylacetyl chloride.

The reaction of the 2-amino-1-indanol with sodium hydride and the acetyl compound wherein R₁ represents methoxy or ethoxy proceeds when the reactants are contacted and mixed in an anhydrous inert organic solvent as a reaction medium. Representative inert organic solvents which can be employed as reaction media include anhydrous benzene, toluene and the like, and representative inert gases can include nitrogen, helium, argon or the like. The reaction proceeds at temperatures of from about 10° C. to about 120° C. and is preferably carried out at the boiling temperature of the reaction mixture under reflux. The exact proportion of the reactants to be employed is not critical; however, the 2-amino-1-indanol, sodium hydride and the methyl or ethyl chloroacetate are consumed in equimolar proportions and the reactants are preferably employed in such proportions. The reaction is generally complete in about 0.5 to 5 hours depending upon the reaction temperature employed. The product can be separated from the reaction mixture by conventional procedures, such as evaporation of the reaction medium, followed by acidifying the residue by the addition of aqueous acid and extraction with organic solvents to separate the product from materials such as the sodium salt of the aqueous acid employed. The product can then be obtained by evaporation of the extraction solvent. The product can be purified by recrystallization from organic solvents such as benzene, chloroform, pentane and the like.

In preparing the compounds wherein R is phenyl by the reaction of an aminoindanol corresponding to Formula III with a substituted acetyl compound corresponding to Formula IV wherein X and R₁ both represent chlorine or bromine, the preparation of the indanol compound is carried out by a two-step reaction procedure. In such procedure, the 2-amino-1-indanol reacts with an α-halophenylacetyl halide in the presence of a hydrogeton halide acceptor to prepare an N-(1-hydroxy-2-indanyl)α-halophenylacetamide which is then cyclized in the presence of alkali metal hydroxide to obtain the indeno oxazine product. The reaction of the 1-amino-2-indanol and the α-halophenylacetyl halide proceeds when the reactants and a hydrogen halide acceptor such as sodium carbonate or potassium carbonate are contacted and mixed in an inert organic solvent as a reaction medium, and preferably under an inert gas atmosphere such as a nitrogen blanket or the like. Representative inert organic solvents which can be employed as reaction media include chloroform, methylene dichloride and ethylene dichloride. The reaction of the 1-amino-2-indanol and the α-halophenylacetyl halide proceeds with the production of hydrogen halide of reaction at temperatures of about −5° C. to about 30° C. and is preferably carried out at about −5° C. to about 25° C. The exact proportion of the reactants to be employed is not critical; however, the reaction consumes the reactants in equimolar proportions and the reactants are preferably employed in such proportions, preferably with an excess of hydrogen halide acceptor being employed. The reaction is generally complete in about 4 to about 48 hours depending upon the reaction temperature employed. Salt by-products formed by the reaction of the hydrogen halide of reaction with the hydrogen halide acceptor can be separated from the reaction mixture by filtration, decantation, extraction or the like. The N - (1 - hydroxy-2-indanyl)α-halophenyl-acetamide intermediate prepared by such reaction can then be separated by evaporation or the like and purified by recrystallization or other conventional procedures or employed directly to prepare the indeno-oxazine compound. The cyclization of the intermediate proceeds when the intermediate is contacted with an alcoholic solution of alkali metal hydroxide, and proceeds at temperatures of from about 10° C. to about 50° C. The intermediate compound is preferably contacted with an excess of potassium hydroxide in a sufficient amount of an alcohol such as methanol, ethanol or isopropanol to provide a pH of about 7 to 9 in the reaction mixture. The cyclization is generally complete in from about 10 to about 48 hours, after which the product can be separated by cooling the mixture to crystallize the product and filtering or decanting to separate the product from the liquid mixture. The product can then be purified by conventional procedures such as recrystallization or washing.

The compounds of the invention corresponding to Formula II wherein R' represents hydrogen are prepared by the reduction of an indeno-oxazine compound corresponding to Formula I, typically with a strong reducing agent such as lithium aluminum hydride.

The reaction proceeds when the reactants are contacted and mixed in an inert organic liquid such as tetrahydrofuran, ether or dioxane as a reaction medium. The reaction proceeds at temperatures of from about 20° C. to about 110° C. and is preferably carried out at the boiling point of the reaction mixture under reflux. The strong reducing agent is employed in excess, for example, from about 2 to about 5 molar proportions of lithium aluminum hdyride are employed for each molar proportion of indeno-oxazine starting material. The reaction is generally complete in about 3 to 10 hours depending upon the reaction temperature employed. The product can be separated from the reaction mixture by the portionwise addition of water to decompose unreacted reducing agent, followed by filtration to remove the decomposition products. The product can be separated by conventional procedures such as evaporation of the reaction medium and purified by conventional techniques such as recrystallization and washing.

The compounds corresponding to Formula II wherein R' represents methyl are prepared by the reaction of formaldehyde with a compound corresponding to Formula II wherein R' represents hydrogen, the reaction being carried out in the presence of formic acid. The reaction proceeds when the reactants are contacted and mixed with formic acid, and is carried out at a temperature of from about 20° C. to about 125° C., preferably at a temperature of from about 75° C. to about 100° C. In a convenient procedure, an inert organic liquid such as benzene or toluene can be employed as a reaction medium, however, it is also preferred to employ a large excess of formic acid, which also serves as a reaction medium. The indeno-oxazine compound and the formaldehyde are preferably employed in substantially equimolar proportions, although the exact proportions of the reactants to be employed can be varied considerably. The reaction is generally complete in about 3 to about 5 hours, depending upon the reaction temperature employed. The product can be separated by conventional procedures such as evaporation or extraction or the like, and in a convenient procedure the reaction mixture is treated with aqueous acid to convert the product to a pharmaceutically-acceptable salt, the resulting mixture is evaporated and the residue treated with aqueous alkali metal hydroxide to release the free base, which can be separated by extraction with organic solvents. Purification of the product can be accomplished by conventional techniques.

The pharmaceutically-acceptable salts of the indeno-oxazines are conveniently prepared by dissolving the free base compound in a solvent such as methanol, ethanol or ether and thereafter adding an excess of a pharmaceutically-acceptable acid such as hydrochloric, hydrobromic, sulfuric, malic, maleic or citric acid or the like until precipitation of the product is complete. The product can be separated by conventional procedures such as evaporation, filtration or centrifugation and purified by conventional procedures such as recrystallization.

The free base indeno-oxazines can be prepared from the salts by mixing the salt or a solution of the salt in a minimal amount of methanol with an excess of an aqueous base such as sodium hydroxide, potassium hydroxide or sodium carbonate. The free base indeno-oxazine can be separated by conventional procedures such as extraction with an organic solvent such as benzene, ether, or a chlorinated hydrocarbon solvent. The free base can be purified by conventional procedures such as recrystallization or it can be converted to a pharmaceutically-acceptable salt.

DESCRIPTION OF THE PREFERRED EMBODIMENTS

The following examples illustrate the invention but are not to be construed as limiting the same.

Example 1

2-amino-1-indanol (14.9 grams; 0.1 mole) is mixed with 150 milliliters of anhydrous benzene and 5.16 grams of a hydrocarbon liquid dispersion containing 50 percent by weight of sodium hydride. The mixture is cooled in an ice bath under a nitrogen blanket while ethyl chloroacetate (12.3 grams; 0.1 mole) is added portionwise with stirring over a 25 minute period. The mixture is stirred for one hour at a temperature of about 25° C. and is then heated at the boiling temperature under reflux for 1.5 hours. The mixture is concentrated in vacuo and the residue is taken up in about 300 milliliters of chloroform. The chloroform solution is washed with dilute aqueous hydrochloric acid, dried with anhydrous sodium carbonate, filtered and then evaporated under reduced pressure. The 4,4a,5,9b-tetrahydroindeno[1,2-b]-1,4-oxazin-3-(2H) - one product is obtained as a residue on evaporation of the chloroform solution and is recrystallized from benzene and found to melt at a temperature of 171°–172° C. The structure of the product is confirmed by elemental analysis, infrared spectroscopy, and nuclear magnetic resonance analysis.

Example 2

4,4a,5,9b-tetrahydroindeno[1,2-b]-1,4-oxazin-3 - (2H)-one (9.47 grams; 0.05 mole) is added portionwise to a dispersion of 6.3 grams of lithium aluminum hydride in 600 milliliters of tetrahydrofuran. The mixture is heated at the boiling temperature under reflux for about 5 hours.

The mixture is cooled and 7 milliliters of water are added thereto followed by 10 milliliters of aqueous 10 percent sodium hydroxide solution, followed by 15 milliliters of water. The resulting mixture is stirred for 30 minutes after which anhydrous sodium sulfate is added to the mixture and the mixture is filtered. The filter cake is washed with about 40 milliliters of chloroform and the combined washings and filtrate are evaporated under reduced pressure. The 2,3,4,4a,5,9b-tetrahydroindeno[1,2-b]-1,4-oxazine product is obtained as a residue from the evaporation. The product is dissolved in a small amount of methanol and the methanol solution is mixed with an ethanol solution of hydrogen chloride. The alcohols are removed by evaporation under reduced pressure and the 2,3,4,4a,5,9b-tetrahydroindeno[1,2-b]-1,4-oxazine hydrochloride product is recrystallized from ethanol and found to melt at a temperature of 210° C.

Example 3

2,3,4,4a,5,9b-hexahydroindeno[1,2-b]-1,4-oxazine (6.0 grams; 0.034 mole), prepared as described above in Example 2, is mixed with 6.2 grams of formic acid. 3.9 milliliters of an aqueous solution containing 37 percent by weight of formaldehyde (0.051 mole) is added to the resulting mixture. The mixture is stirred at a temperature of about 30° C. for 20 minutes and is then heated at a temperature of 100° C. on a steam bath for 5 hours. The mixture is cooled, mixed with 6 milliliters of concentrated hydrochloric acid, and concentrated by evaporation under reduced pressure. The residue containing the 2,3,4,4a,5,9b-hexahydro-4-methyl-indeno[1,2-b]-1,4-oxazine product in the form of its hydrochloride salt is mixed with excess aqueous dilute sodium hydroxide (about 2.5 molar) and the aqueous solution is then extracted with benzene. The benzene extract is dried with anhydrous sodium carbonate, filtered and evaporated under reduced pressure to obtain the 2,3,4,4a,5,9b-hexahydro-4-methyl-indenol[1,2-b]-1,4-oxazine product, having a molecular weight of 189.3, as the free base. The free base product is dissolved in a minimal amount of ethanol and mixed with excess maleic acid until precipitation of the maleate salt product is complete. The 2,3,4,4a,5,9b-hexahydro-4-methyl-indeno[1,2-b]-1,4-oxazine maleate product is found to melt at a temperature of 131°–133° C. The structure of the product is confirmed by elemental analysis, nuclear magnetic resonance analysis, and infrared spectroscopy.

Example 4

2-amino-1-indanol (20.3 grams; 0.136 mole) and 37 grams of sodium carbonate are mixed together with 250 milliliters of methylene chloride and the mixture is cooled to the temperature of —5° C. Over a thirty-minute period α-bromophenylacetyl chloride (32.7 grams; 0.14 mole) is added portionwise to the mixture. During the addition of the α-bromophenylacetyl chloride the mixture is maintained at a temperature of —5° C. to 0° C. under a nitrogen atmosphere, and the mixture is stirred under the nitrogen atmosphere at a temperature of 0° C. for 3.5 hours. The mixture is then stirred at ambient temperature for 18 hours. The mixture is filtered and the filtrate is concentrated by evaporation under reduced pressure. The evaporation residue is taken up in benzene. The benzene mixture is filtered and the filtrate is concentrated by evaporation under reduced pressure. The residue is mixed with 160 milliliters of ethanol containing 5.9 grams of potassium hydroxide and the resulting mixture is stirred for 16.5 hours at room temperature. An alcohol potassium hydroxide solution is added to the mixture to provide a pH of 8 in the ultimate mixture, and the mixture is stirred at ambient temperatures for an additional 2.5 hours. The mixture is cooled until precipitation of the product is complete, and the mixture is filtered to obtain the 4,4a,5,9b-tetrahyro-2-phenyl-indeno[1,2-b]-1,4-oxazin-3-(2H)-one product as a filtered cake. The product is washed with cold methanol and found to melt at a temperature of 217°–218° C. The structure of the product is confirmed by elemental analysis and infrared spectroscopy.

EXAMPLE 5

4,4a,5,9b-tetrahydro-2-phenyl-indeno[1,2-b]-1,4-oxazin-3(2H)-one, prepared as described above in Example 4, (6.7 grams; 0.025 mole) is added portionwise to a dispersion of 3.26 grams of lithium aluminum hydride in 465 milliliters of tetrahydrofuran under a nitrogen blanket. The mixture is heated at a temperature of 55° C. for 5 hours and then held for about 18 hours at ambient temperature. Small amounts of water are added to the resulting mixture to decompose excess unreacted lithium aluminum hydride and the mixture is filtered to remove the solid decomposition product. The filtrate is evaporated under reduced pressure and the 2,3,4,4a,5,9b-hexahydro-2-phenylindeno[1,2-b]-1,4-oxazine product is obtained as a viscous liquid evaporation residue which solidifies on standing. The free base product is found to melt at a temperature of 115°–120° C. The structure of the free base is confirmed by nuclear magnetic resonance analysis. The free base product is dissolved in anhydrous ether, the ether solution is filtered, and excess ethereal maleic acid is added to the ether solution until precipitation is complete. The mixture is filtered and the 2,3,4,4a,5,9b-hexahydro-2-phenylindeno[1,2-b]-1,4-oxazine maleate product is obtained as a crystalline solid filter cake. The product is recrystallized from ethanol and found to melt at a temperature of 188°–189° C. The structure of the product is confirmed by elemental analysis and infrared spectroscopy.

In employing the indeno-oxazine compounds of the invention for the alleviation of depression in animals, the compounds are administered internally to an animal in an antidepressant amount. The compounds can be administered by conventional procedures such as intraperitoneal, subcutaneous, or intramuscular injections or by oral administration. The indeno-oxazine compounds can be formulated by conventional procedures in treating compositions by admixture of one or more indeno-oxazine compounds of the invention with a pharmaceutical carrier and can be formulated as sterile injectable compositions, tablets, capsules and the like.

Antidepressant activity of the indeno-oxazine compounds is indicated by inhibition of reserpine induced depression in mice and by potentiation of the toxicity of d-amphetamine sulfate. In representative operations, representative indeno-oxazine compounds of the invention are found to potentiate the symptoms of hyper-excitement and hyper-irritability induced in mice by the intraperitoneal injection of amphetamines. In such operations, groups of mice are administered a test compound by intraperitoneal injection at various dosage rates. Thirty minutes later, the mice are administered d-amphetamine sulfate by intraperitoneal injection at a dosage rate of 4 milligrams per kilogram of animal body weight. The mice are then placed in a small wire mesh cage, each group of ten mice per group being placed in a cage measuring 16 centimeters on the side. The intraperitoneal injection of 10 milligrams per kilogram of amphetamine to mice, followed by aggregation of the mice in such small cages, results in hyper-excitement, fighting and death of the mice within about 5 hours. The administration of 4-milligrams of amphetamine per kilogram is not generally fatal under the described conditions. In such operations, potentiation of amphetamine toxicity is obtained with mice administered 250 milligrams of 4,4a,5,9b-tetrahydro-2-phenyl-indeno[1,2-b]-1,4-oxazin-3(2H)-one per kilogram, 100 percent fatality of the mice being observed. In other operations the dosage of 2,3,4,4a,5,9b-hexahydro-4-methyl-indeno[1,2-b]-1,4-oxazine maleate required to produce death in 50 percent of the mice treated ($ED_{50}$) is calculated to be 13.9 milligrams per kilogram.

In other operations, separate indeno-oxazine compounds are administered to separate groups of mice at various dosage rates by intraperitoneal injection. 0.5 hour after the administration of the indeno-oxazine compound, reserpine is administered to each mouse at a dosage rate of 5 milligrams per kilogram by intraperitoneal injection. The administration of 5 milligrams per kilogram of reserpine intraperitoneally to untreated mice results in a progression of symptoms beginning with drooping of the eyelids (ptosis) culminating in a generalized depression with decreased spontaneous motor activity and decreased responsiveness to external stimuli. Following the administration of the reserpine, the test animals are observed for the above signs of depression. Inhibition of reserpine depression is indicated when the mice are observed to exhibit no ptosis and to have normal spontaneous motor activity and normal responsiveness to stimuli. In such operations, 2,3,4,4a,5,9b - hexahydroindeno[1,2-b]-1,4-oxazine hydrochloride and 2,3,4,4a,5,9b - hexahydro-4-methyl-indeno[1,2-b]-1,4-oxazine maleate are found to have $ED_{50}$'s of 15.7 and 12.3 milligrams per kilogram, respectively.

What is claimed is:

1. A substituted indeno[1,2-b]-1,4-oxazine compound corresponding to one of the formulae

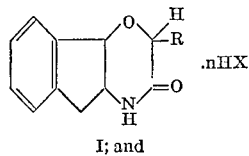

I; and

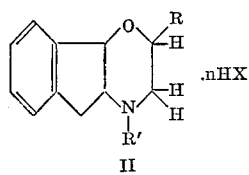

II wherein R represents phenyl or hydrogen, R' represents hydrogen or methyl, n represents one of the integers zero and one and HX represents the anionic moiety of a pharmaceutically-acceptable salt.

2. A compound of claim 1 wherein the compound corresponds to the formula:

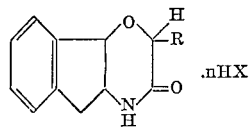

3. A compound of claim 2 wherein R is phenyl.

4. A compound of claim 1 wherein the compound corresponds to the formula:

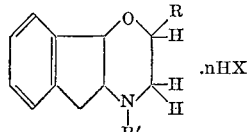

5. A compound of claim 4 wherein R' is methyl.
6. A compound of claim 4 wherein R is hydrogen.
7. The compound of claim 1 wherein the compound is 2,3,4,4a,5,9b-hexahydroindeno[1,2-b]-1,4-oxazine hydrochloride.
8. The compound of claim 1 wherein the compound is 2,3,4,4a,5,9b-hexahydroindeno[1,2-b]-1,4-oxazine.
9. The compound of claim 1 wherein the compound is 2,3,4,4a,5,9b-hexahydro - 4 - methyl-indeno[1,2-b]-1,4-oxazine maleate.
10. The compound of claim 1 wherein the compound is 4,4a,5,9b-tetrahydro - 2 - phenylindeno[1,2-b] - 1,4-oxazin-3(2H)-one.

References Cited

Chemical Abstracts Seventh Collective Index Subjects HY-LIT vol. 56–65 (1962–1966) p. 11, 657S (1969).

Drefahl et al., Chem. Ber. vol. 99, pp. 1174–8 (1966).

Heinzelmann et al., J. Amer. Chem. Soc. vol. 70, pp. 1386–90 (1948).

NATALIE TROUSOF, Primary Examiner

U.S. Cl. X.R.

424—248